United States Patent [19]

Grasso et al.

[11] Patent Number: 5,054,876
[45] Date of Patent: Oct. 8, 1991

[54] OPTICAL FIBER TELECOMMUNICATION LINE INCLUDING AMPLIFIERS DISTRIBUTED ALONG THE LINE FOR THE TRANSMITTED SIGNALS

[75] Inventors: Giorgio Grasso, Monza; Aldo Righetti, Milan; Flavio Fontana, Cormano, all of Italy

[73] Assignee: Societa' Cavi Pirelli S.p.A., Milan, Italy

[21] Appl. No.: 555,941

[22] Filed: Jul. 20, 1990

[30] Foreign Application Priority Data

Jul. 21, 1989 [IT] Italy .................. 21258 A/89

[51] Int. Cl.$^5$ .......................................... G02B 6/28
[52] U.S. Cl. .................................... 385/24; 385/27; 359/333; 359/345
[58] Field of Search ............ 350/96.16, 96.15, 96.14; 372/6; 330/4.3

[56] References Cited

U.S. PATENT DOCUMENTS

| | | | |
|---|---|---|---|
| 4,636,029 | 1/1987 | Johansson et al. | 350/96.16 |
| 4,680,809 | 7/1987 | Hartkopf et al. | 350/96.16 |
| 4,815,804 | 3/1989 | Desurvire et al. | 350/96.16 X |
| 4,863,230 | 9/1989 | Webb | 350/96.16 X |
| 4,886,334 | 12/1989 | Aoki | 350/96.16 X |
| 4,958,910 | 9/1990 | Taylor et al. | 350/96.15 X |

Primary Examiner—John D. Lee
Assistant Examiner—Phan T. Heartney
Attorney, Agent, or Firm—Brooks Haidt Haffner & Delahunty

[57] ABSTRACT

An optical fiber telecommunication line composed of a number of series connected optical cables arranged end-to-end includes an active core optical fiber amplifier for the transmitted signals between each adjacent pair of optical cables. Two pumping optical radiation sources are connected to each active core optical fiber within each of the amplifiers, one source for each end of a single active core optical fiber. One of these two sources is placed into service and the second one is kept in reserve to be placed into service if the first one fails. A microprocessing circuit causes the sources to send distinctive recognizable alarm signals indicative of the state of an associated amplifier to terminal stations at the ends of the line and to receive therefrom control signals to control and exchange the functions between the two sources as necessary.

13 Claims, 4 Drawing Sheets

OPTICAL FIBER TELECOMMUNICATION LINE INCLUDING AMPLIFIERS DISTRIBUTED ALONG THE LINE FOR THE TRANSMITTED SIGNALS

BACKGROUND OF THE INVENTION

1. Field of the Invention

The present invention relates to an optical fiber telecommunication line, for example, a submarine line, comprising amplifiers for transmitted optical signals and of the type in which lengths of active core optical fibers are used for amplification.

Also, the present invention relates to optical signal amplifiers for optical fiber telecommunication lines, for example, submarine lines and the like, in which the amplifiers are arranged in positions not easily accessible, of the type making use of lengths of active core optical fiber.

2. Description of the Prior Art

As is known, optical fibers of the so-called "active core" type comprise, inside a cladding, at least a core wherein here are doping substances which besides making the refractive index of the core higher than that of the cladding become optical radiation sources having a wavelength $\lambda_1$ used for the transmission when struck by a radiation having a wavelength $\lambda_2$ (different from $\lambda_1$). The wavelength $\lambda_2$ is different according to the particular doping substance used.

Examples of doping substances having this characteristic are erbium and neodymium.

More particularly, in active core optical fibers the emission of optical radiation having a wavelength $\lambda_1$ takes place when a radiation having a wavelength $\lambda_2$, ususally called umping optical radiation, travels in the optical fiber.

Since the phenomenon of the amplification of the signals made through the so-called active core optical fibers is known a further description will not be given.

The use of amplifiers provided with active core optical fiber lengths in the optical fiber telecommunication submarine lines will supersede the use of optoelectronic repeaters of the transmitted signals because of a greater reliability in comparison to optoelectronic repeaters due to a lower content of electronic components.

In fact, as is known, the electronic components present in the optoelectronic repeaters are quite important and are of the type operating at high frequencies. This is because, in the opto electronic repeaters, the input optical signal modulated at high frequency is transformed into an electric signal necessarily at high frequency, the electric signal is amplified at high frequency and said amplified electric signal is transformed again into an amplified optical signal still at high frequency which is transmitted at the output of the repeaters.

These high frequency electronic components have proven to be not very reliable over a long length of time due to their failures with the consequent interruption of the line operation.

This drawback is clearly very undesirable in particular in optical fiber telecommunication submarine lines. In addition to this, there is difficulty of access to the optoelectronic repeaters for repair purposes and the long time required for putting the line back into service.

Unlike the optoelectronic repeaters, the known amplifiers provided with active core optical fibers do not contain high frequency electronic components, and the only delicate element they comprise is the pumping optical radiation source constituted in general by a laser, a laser diode or the like.

However, although the optical fiber telecommunication lines comprising active core optical fiber amplifiers are more reliable with respect to the optoelectronic repeaters because of the lower risk of failures, they are not able to communicate to the terminals of the line, and in case of submarine lines to the land ends, signals corresponding to impropeer operation that can arise during the operation thereof and in case of failure, it is practically impossible to locate the failure along the line.

For this reason, in the optical fiber telecommunication lines, it is important to provide a plurality of reserve optical channels both in the cables and in the repeaters of in the amplifiers independent of one another to operate when a working optical channel is not utilizable. Clearly, this constitutes a considerable complexity and a reduction in the effectiveness of the present optical fiber telecommunciation lines.

SUMMARY OF THE INVENTION

One object of the present invention is that of improving the reliability and efficiency of the optical fiber telecommunication lines comprising amplifiers of the transmitted signals and of making possible a control from the terminal stations in response to optical signals indicating the operating conditions of any amplifier of the line and of the cable optical fibers so as to maintain all the optical channels in optimum working condition. It is also an object of the invention to reduce the number of the reserve optical channels, to be able to intervene in order to return to service an optical channel in case of failure inside an amplifier and to locate immediately from the land ends the position of the line at which the failure has occurred and thereby reduce the out of service time.

In accordance with the present invention, the optical fiber telecommunication line comprises at least a first and a second optical fiber cable arranged in series and connected together by means of an amplifier of the transmitted signals, said amplifier comprising, inside a sealed envelope which is connected to the facing ends of the optical fiber cables, at least an active core optical fiber length whose ends are optically connected, to an optical fiber of the first cable and to an optical fiber of the second cable, respectively. A first pumping optical radiation source is connected to one of the two ends of the active core optical fiber length. Said line is characterized by the fact of providing at least at one of its ends a low frequency modulation of the optical radiation for the transmission of the signals, and by the fact that, inside the amplifier, there are a second pumping optical radiation source, connected to the other end of the active core optical fiber length which monitors the variations of intensity of the pumping optical radiation inside the active core optical fiber length and transmits signals which are function of said variations to a control circuit of at least a low frequency modulator of the pumping optical sources and a switch between the first and the second pumping optical radiation source.

Another object of the present invention is an amplifier for optical fiber telecommunication lines comprising inside a sealed envelope, which is connected to the ends of a first and a second optical fiber cable, at least a length of an active core optical fiber whose ends are optically connected to an optical fiber of the first cable and to an optical fiber of the second cable, a first source of optical pumping radiation being connected to one of the two ends of the active core optical fiber length, said amplifier being characterized by the fact of comprising a second source of optical pumping radiation connected to the other end of the active core optical fiber portion, a microprocessing circuit connected to the two ends of the active core optical fiber portion which monitors the variations of intensity of the pumping optical radiation inside the active core optical fiber length and sends signals which are functions of said variations to a control circuit of at least a low frequency modulator of the optical pumping sources and a switch between the first and the second optical pumping optical radiation sources.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DESCRIPTION OF THE PREFERRED EMBODIMENTSS OF THE INVENTION

Figure 1:
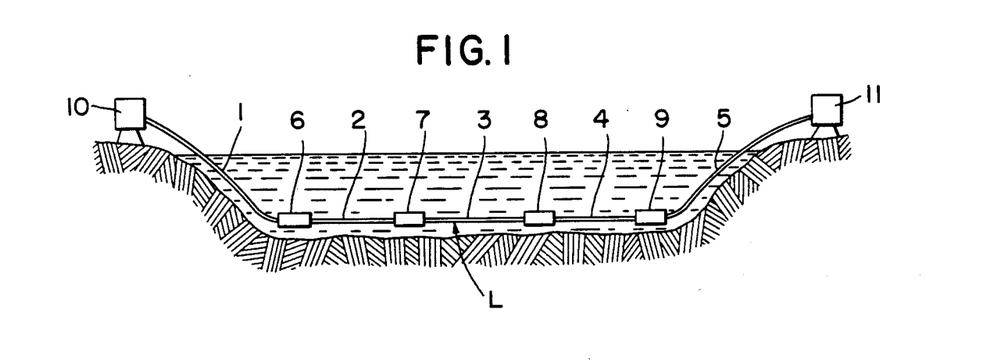
FIG. 1 illustrates schematically an optical fiber telecommunication submarine line according to the invention.

An optical fiber telecommunication submarine line L, constituting a particular case of a line according to the invention, is schematically illustrated in FIG. 1. It comprises a plurality of optical fiber cables 1, 2, 3, 4 and 5 arranged in series the one after the other and connected in pairs to amplifiers 6, 7, 8 and 9 for the optical signals transmitted along the line.

At the ends of the line there are, a transmitting-receiving station 10 and a receiving-transmitting station 11, respectively.

The optical fiber cables 1, 2, 3, 4, and 5 are all of any conventional type and comprise a mechanically resistant armor apt to withstand all the mechanical tensile stresses applied during the laying or the recovery operations of the line, a core comprising at least an optical fiber enclosed inside a tight sheath and electric conductors for feeding the amplifiers of the transmitted signals.

As the optical fiber cables 1, 2, 3, 4 and 5, similar or different from one another, are of any conventional type, no description of their structure will be given.

Examples of known submarine cables, are described in U.S. Pat. Nos. 4,676,590 and 4,690,498 assigned to the assignee of the present application and the disclosures of which are incorporated herein by reference.

As previously indicated, said cables 1, 2, 3, 4 and 5 are connected to one another in pairs by means of amplifiers of the transmitted signals.

In particular, the cables 1 and 2 are mutually interconnected through the amplifier 6, the cables 2 and 3 are mutually interconnected through the amplifier 7, the cables 3 and 4 are mutually interconnected through the amplifier 8 and the cables 4 and 5 are mutually interconnected through the amplifier 9.

Figure 2:
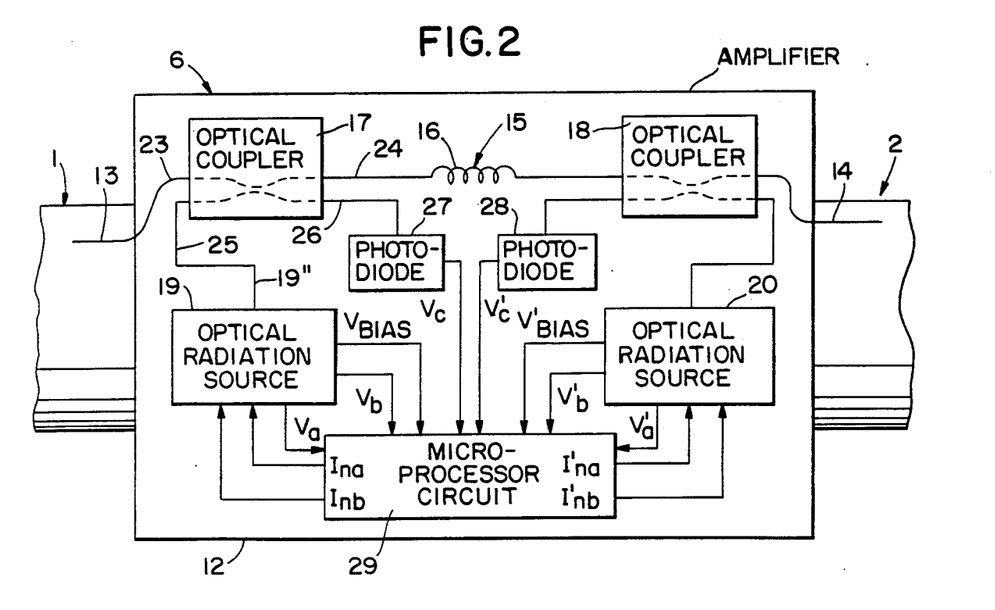
FIG. 2 illustrates schematically the elements of an amplifier for optical fiber telecommunication lines according to the invention.

FIG. 2 shows, schematically, one of the amplifiers, for example, the amplifier 6 interposed and interconnecting two optical fiber cables, for example, cables 1 and 2.

The amplifier 6 includes a sealed enclosure or envelope 12 containing the amplifying means 15, which will be described in further detail hereinafter and by which the optical signals coming from the cable 1 are amplified. From the amplifier, said amplified signals are transmitted to cable 2, and signals indicating the working conditions of the amplifying means 15, the control of the conditions of the optical fibers 13 and 14 and the actions of modification of the amplifying means as a consequence of the control signals emitted by one of the stations 10 and/or 11.

The enclosure or envelope 12 also is mechanically resistant both to the ambient hydrostatic pressure where the amplifier is located and to the mechanical stresses during the laying or recovery of the line.

However, the mechanically resistant structure of the amplifier 6 need not be provided by the envelope 12 itself, and instead, may be provided by other means.

Moreover, the envelope 12 is connected, always in a sealed manner, to the ends of the cables 1 and 2 facing the amplifier 6, and all the optical fibers 13 and 14 of the cables 1 and 2, respectively, penetrate the envelope 12 of the amplifier 6.

For the sake of clarity of representation, FIG. 2 shows only one optical fiber 13 of the cable 1 and only one optical fiber 14 of the cable 2 connected to each other through the amplifying means 15 by which the optical signals coming from the optical fiber 13 of the cable 1, which have unavoidably suffered an attenuation during their transmission, are amplified and sent into the optical fiber 14 of the cable 2.

Each of the optical fibers of the cable 1 is connected to the individual optical fibers of the cable 2 by similar amplifying means 15.

Said amplifying means 15 is used to carry out the amplification of the optical signals, the control and the notification to one of the terminal stations 10 and 11 (for example station 11) about the working efficiency conditions of the amplifier, and the actions of intervention on the amplifying means in consequence of the control signals coming from the terminal stations 10 and 11 of the line.

The amplifying means 15 comprises a length of an active core optical fiber 16 of a known type and described in general terms hereinbefore.

At the ends of the lentgth of active core optical fiber 16 there are an optical coupler 17 and an optical coupler 18. The optical fiber 13 is connected to the optical coupler 17, while the optical fiber 14 is connected to the optical coupler 18.

Moreover, the optical coupler 17 is connected to a pumping optical radiation source, for example, a laser unit 19 including laser or a laser diode, provided with its own electric circuit described hereinafter in detail with reference to FIG. 5, and the optical coupler 18 is connected to another pumping optical radiation source or laser unit 20 including a laser or a laser diode provided with its own electric circuit identical to the one associated with the laser unit 19.

Figure 3:
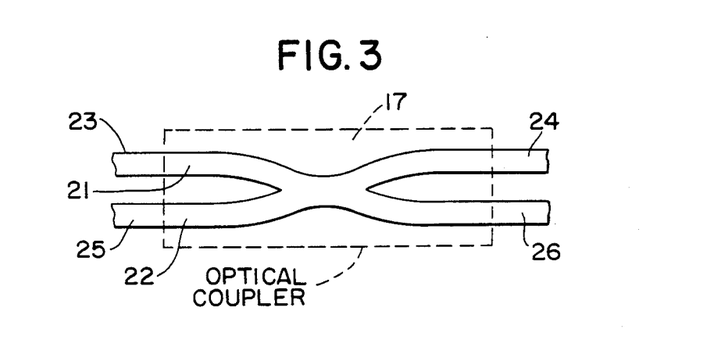
FIG. 3 illustrates a component of the amplifier of FIG. 2.

The couplers 17 and 18 are exactly alike and, for example, each is a four termination dichroic coupler. FIG. 3 shows a example of one of said couplers.

As shown in FIG. 3, the coupler 17 illustrated therein is formed by two optical fiber portions 21 and 22 closely joined together through the melting of the related cladding in the central parts leaving the ends 23 and 24 (of the optical fiber portion 21) free, the ends 25 and 26 (of the optical fiber portion 22) free.

The ends 23 and 24 of the coupler 17 are connected, respectively, to the optical fiber 13 and to the active core optical fiber length 16. The end 25 is connected to the laser unit 19 whereas the end 26 is connected to a photodiode 27.

Likewise, the coupler 18, exactly like the coupler 17, is similarly connected to the length 16, the optical fiber 14, a photodiode 28, and the laser unit 20.

The particular dichroic couplers 17 and 18 are described only by way of example, and other types of dichroic couplers, known to those skilled in the art, such as the so-called micro-optics couplers, the so-called planar optics couplers and the like can be substituted for the couplers 17 and 18.

The couplers 17 and 18 are optically connected to photodiodes 27 and 28, respectively, which are shown in greater detail in FIG. 4 and further described hereinafter.

The photodiodes 27 and 28 are connected to a microprocessing circuit 29 (described hereinafter with reference to FIG. 7) to which the circuits associated with the laser units 19 and 20 (described hereinafter with reference to FIG. 5) also are connected.

Figure 4:
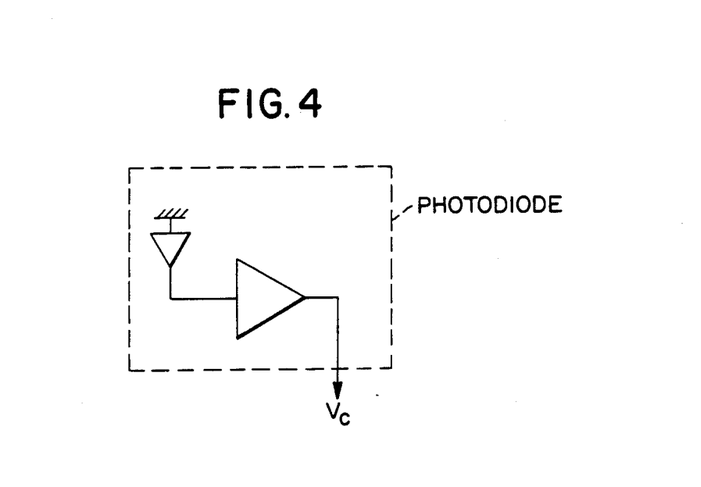
FIG. 4 illustrates schematically a first embodiment of a circuit of an amplifier element.

FIG. 4 shows schematically the photodiode 27, with an associated amplifier 27', which emits, when the laser unit 19 is working, a signal $V_c$, directed to the microprocessing circuit 29, the signal $V_c$ having an intensity which is a function of the intensitity of the pumping optical radiation at the output of the dichroic coupler 17 through the end 26 of the coupler 17.

The photodiode 28, exactly like the photodiode 27, is provided with its own amplifier which, when the laser unit 20 is working, emits a similar signal $V'_c$ directed to the microprocessing circuit 29.

As previously stated, each laser unit 19, 20 is associated with an electric circuit.

Figure 5:
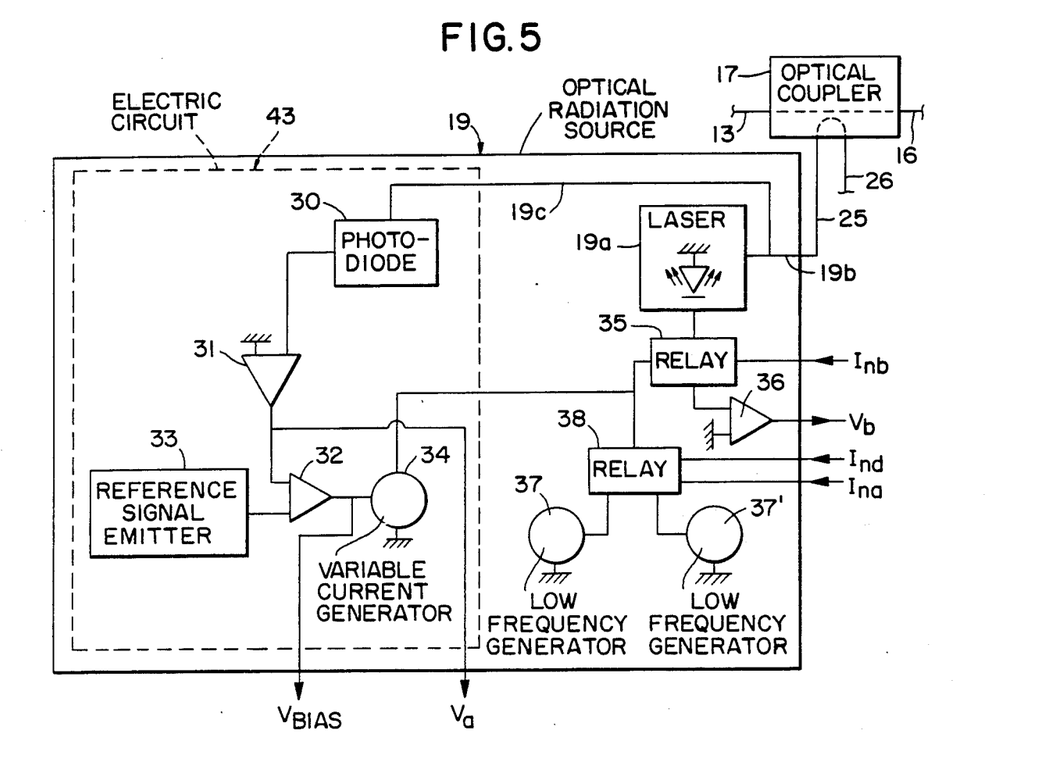
FIG. 5 illustrates schematically a particular embodiment of another element of the amplifier comprising a laser for the pumping optical radiation.

FIG. 5 shows schematically the electric circuit associated with the laser in the laser unit 19 which is identical to the electric circuit associated with the laser in the laser unit 20.

As shown in FIG. 5 the laser 19a itself is connected to the end of the dichroic coupler 17 through an optical fiber 19b and to a photodiode 30 associated with an amplifier 31 through an optical fiber 19c.

The signal $V_a$ emitted by the amplifier 31, the value of which is directly proportional to the intensity of the optical radiation emitted by the laser 19a, is sent both to the microprocessing circuit 29 and to a comparator 32. In the comparator 32, the signal $V_a$ is compared with a reference signal emitted by a reference signal emitter 33.

The comparison signal $V_{bias}$ emitted by the comparator 32 is sent both to the microprocessing circuit 29 and to a control circuit of a variable current generator 34 feeding the laser 19a.

In the connection between the variable current generator 34 and the laser 19a a relay 35 is interposed which can be set in action by a signal $I_{nb}$ emitted by the microprocessing circuit 29.

Moreover, the relay 35 is connected to an amplifier 36 of electric signals $V_b$ directed to the microprocessing circuit 29, said signals being emitted by the laser unit 19, when the latter does not operate as laser and operates as photodiode.

In addition, a modulating generator 37 operating at a predetermined low frequency, and preferably, two generators 37 and 37' operating at different low frequencies, is connected to the conductor for connecting the variable current generator 34 with the relay 35. Said predetermined low frequency generator 37 is provided with a relary 38 activated by the signals $I_{na}$ and $I_{nd}$ emitted by the microprocessing circuit 29. As previously stated, the electric circuit associated with the laser unit 20 is like that of the laser unit 19 and therefore, it will not be otherwise described.

However, the signals of the electric circuit associated with the laser of the laser unit 20 are like those previously described for the electric circuit of the laser unit 19, and in the description given hereinafter, said signals relating to the electric circuit of the laser unit 20 will be indicated with the same symbols used for the circuit of the laser unit 19, but with a "prime" mark.

Figure 6:
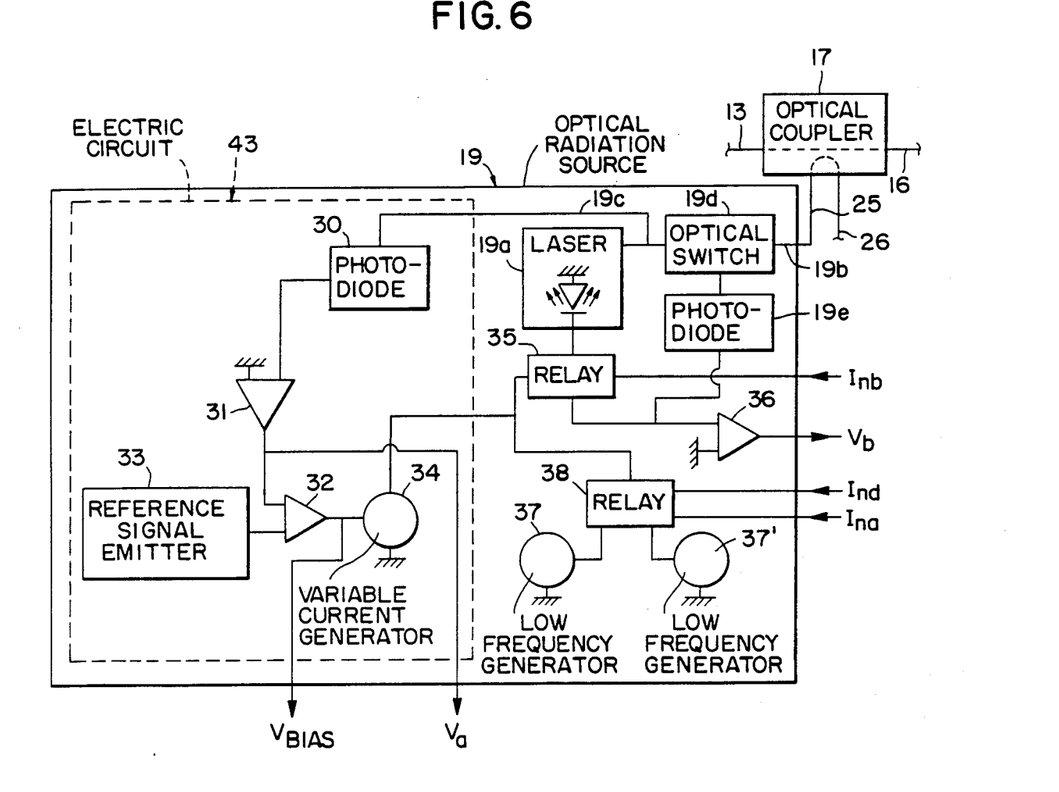
FIG. 6 illustrates schematically an alternative embodiment of the element of the amplifier shown in FIG. 5.

FIG. 6 shows an alternative embodiment of the circuit of FIG. 5 to be used in case there is the danger that the laser unit 19 goes out of service completely and therefore cannot be used either as source of pumping optical radiation or as monitoring photodiode.

The alternative embodiment of FIG. 6 differs from the embodiment of FIG. 5 only be the fact of providing an optical switch 19d, that can be set in action through a signal $I_{nc}$ emitted by the microprocessing circuit 29; the optical switch 19d is inserted in the optical fiber 19b and is connected through a photodiode 19e to the input of the amplifier 36.

Figure 7:
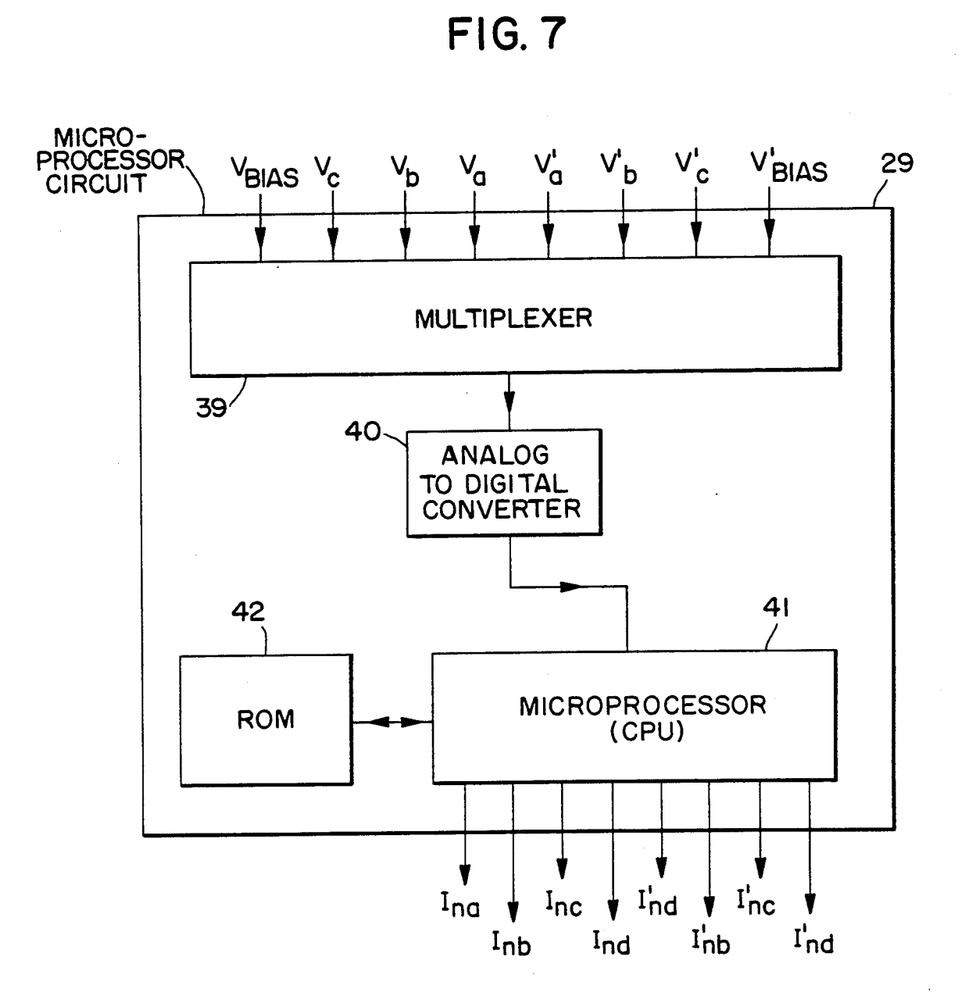
FIG. 7 is a block diagram of a further element of the amplifier.

FIG. 7 is a block diagram of the microprocessing circuit 29.

As shown in FIG. 7 the microprocessing circuit comprises a multiplexer 39 which receives the signals $V_{bias}$, $V_a$, $V_b$ emitted by the electric circuit of the laser unit 19 and the signals $V'_{bias}$, $V'_a$, $V'_b$ emitted by the electric circuit of the laser unit 20, the signals $V_c$ coming from the photodiode 27 and the signals $V'_c$ coming from the photodiode 28 (shown in FIG. 2).

Down line of the multiplexer 39 there is an analog-to-digital converter 40 connected to a microprocessor (CPU) 41 with which a program circuit (ROM) 42 is associated, said program circuit (ROM) 42 operating with the microprocessor 41 enables the latter, in a known manner, to emit the signals $I_{na}$, $I_{nb}$, $I_{nc}$ to the electric circuit of the laser unit 19. In case there is a signal $I_{nd}$, it is also directed to the electric laser unit 19. The signals $I'_{na}$, $I'_{nb}$, $I'_{nc}$, and in case there is a signal, $I'_{nd}$ are directed to the electric circuit of the laser unit 20.

Moreover, in a line according to the invention, there are, at least at one of the two stations 10 and 11 (FIG. 1), circuits for monitoring the signals transmitted by the amplifiers 6, 7, 8 and 9 present in the line, and a circuit for sending to the line control signals for the amplifier components. Since these circuits for monitoring and sending the signals to the line are known and within the capacity of anyone skilled in the art, they will not be described herein.

The operation of the line according to the invention and of the amplifiers according to the invention present in the line will now be described.

During the operation of the line, high frequency optical signals of wavelength $\lambda_1$, originated for example in the station 10 (transmitting station) are sent to the optical fibers in the cable.

The high frequency optical signals of wavelength $\lambda_1$, as they propagate inside the optical fibers 13 of the cable 1, become attenuated, and therefore, they need to be amplified in the amplifier 6 before entering the optical fibers 14 of the optical fiber cable 2.

In the same way, the high frequency optical signals of wavelength $\lambda_1$, travelling along the optical fibers of the cable 2, must be amplified in the amplifier 7 before being sent to the optical fibers of the cable 3.

Likewise, the high frequency optical signals which travel along the optical fibers of the cable 3 need to be amplified in the amplifier 8 before continuing into the optical fibers of the cable 4.

The same thing happens fo the optical signals which travel along the cable 4 and have to be amplified by the amplifier 9 and then conveyed to the cable 5 to as to reach the receiving station 11.

A similar situation arises when the transmitting station is station 11 and the receiving station is the station 10.

As previously stated, FIG. 2 represents schematically the amplifier 6 previously described in its essential components, and the other amplifiers 7, 8 and 9, present in the line, are like the amplifier 6.

In the amplifier 6, ony one of the two laser units, for example, the one indicated with reference numeral 19, is operating to send the pumping energy of wavelength $\lambda_2$, necessary for the amplification, to the length of active core optical fiber 16.

The other laser unit, or pumping optical radiation source 20, is not active as an emitting optical source because it is kept as reserve and acts as a monitoring photodiode.

The pumping optical radiation of wavelength $\lambda_2$ can be modulated at low frequency m6, for example, by the variable current generator 34 of FIG. 5, which can have a programmed modulation in the said generator, called by those skilled in the art "tone". Frequency m6 is different from the low frequency modulation of the pumping optical radiation of the other amplifiers.

In particular, in the amplifiers 6, 7, 8 and 9 the low frequency modulation or "tone" of the single pumping optical radiation respectively has values m6, m7, m8 and m9 different from one another.

All the tones m6, m7, m8 and m9, different from one another, are transmitted in the line and are monitored in the receiving station as signals indicating which lasers are operating in the various amplifiers.

The low frequency modulation of the pumping optical radiations $\lambda_2$ does not disturb the transmission optical signals $\lambda_1$ since these are modulated at a high frequency.

The transmitted optical signals $\lambda_1$, modulated at high frequency and attenuated in consequence of the fact that they travel along the optical fiber 1, enter the amplifier 6.

The transmitted optical signals $\lambda_1$ enter the active core optical fiber 16 through the dichroic coupler 17. Also, the pumping optical radiation of wavelength $\lambda_2$ emitted by the source or laser unit 19 enters the active core optical fiber 16 by way of the coupler 17.

Inside the active core optical fiber 16, due to the previously explained phenomenon, there is amplification of the optical signals of wavelength $\lambda_1$, and by way of the dichroic coupler 18, the amplified signals are introduced into the optical fiber 14 of the cable 2.

The intensity of the pumping optical energy at the input of the active core optical fiber length, expressed as a signal $V_c$, is monitored by the photodiode 27 associated with the dichroic coupler 17.

The intensity of the pumping optical energy at the output of the active core optical fiber length, expressed as signal $V'_c$ is monitored through the electric circuit associated with the laser unit 20 not operating as a radiation emitter and operating as a detecting photodiode.

The two electric signals $V_c$ and $V'_c$ are sent to the microprocessing circuit 29.

Usually the laser unit 19 works very well, and this is due to the action of that part of electric circuit enclosed inside the dashed line 43 (FIGS. 5 & 6).

In fact a signal $V_a$, as a function of the intensity of the pumping optical radiation emitted by the laser unit 19, is monitored through the photodiode 30 and the amplifier 31.

The signal $V_a$, besides being sent to the microprocessing circuit 29 is sent also to the comparator 32 which, operating together with the emitter of reference signals 33, provides control of the variable current generator 34 which acts on the laser 19a so that the intensity of the pumping optical radiation remains substantially constant.

However, it is unavoidable that with the passage of time, aging of the laser 19a is caused, and the signals $V_a$ and $V_{bias}$ send such information to the microprocessing circuit.

In this situation, the microprocessing circuit is programmed, through the memory 42, to emit a signal $I_{na}$ which, acting on the relay 38, causes the application of the low frequency signal from the generator 37 to modulate the output of the laser 19a.

Thus, the laser unit 19 emits an alarm signal, in the form of low frequency modulation or tone $m6_1$ which causes the superimposing of the same low frequency modulation of the transmitted optical signals of wavelength $\lambda_1$ which can be received as an alarm signal at the receiving station 11. Moreover, the microprocessing circuit, programmed through the memory 42, is also able to monitor from the received signals $V_a$ and $V_{bias}$ the operating conditions of the comparator 32 and reference signal emitting device 33. In case of faults in said circuit, the microprocessing circuit can emit a signal $I'_{na}$ which, acting on the relay 38 and on the modulator 37, will cause an alarm signal with a modulation $m6_2$ to be transmitted by the laser 19a.

In these cases, the transmitting station 10, by superimposing a low frequency modulation m6/10 and m6/10' on the optical signals $\lambda_1$, modulated at high frequency, can send a control signal along the line.

This control signal m6/10 causes a modulation of the residual pumping power of wavelength $\lambda_2$ that is monitored by the microprocessing circuit 29 of the amplifier 6 as a control signal directed thereto and causes the microprocessing circuit to emit signals $I_{nb}$ and $I'_{nb}$ to the relays 35 for switching off the laser unit 19 and for switching on the laser unit 20.

In this way, the continued operation of the optical channel for the transmission of telecommunication signals is reset when the laser 19a is not adequate to supply the necessary pumping energy, but it is always able to operate as a monitoring photodiode.

In the case in which the laser 19a, when exhausted as a pumping optical source, is not even able to operate as a monitoring photodiode in the amplifier, the alternative embodiment of FIG. 6 is used. In this embodiment, the microprocessing circuit 29 is programmed to provide, in addition to the control signal $I_{nb}$ or $I'_{nb}$ also the control signal $I_{nc}$ or $I'_{nc}$, when it receives from the transmitting station 10 the control signal m6/10 or m6/10'.

By means of the emission of the signal $I_{nc}$ or $I'_{nc}$, the optical switch 19d is operated and the optical fiber 19b is placed into communication with the monitoring photodiode 19e connected to the amplifier 36 from which the signals $V_b$ (or $V'_b$) directed to the microprocessing circuit 29 are emitted.

The description of the amplifier 6 operation also applies to the amplifiers 7, 8 and 9.

Moreover, the control of the operating conditions of the various optical fibers present in the line derives consequently from the particular structure and from the particular operation of the amplifiers present in the line itself.

In fact, the presence of a fault in the optical fiber of the line can be immediately monitored, located, and transmitted to the terminal stations 10 and 11 in the manner described hereinafter.

If an optical fiber of a cable, for example, the optical fiber 13 of the cable 1 is damaged or broken, the optical signals of wavelength $\lambda_1$ no longer reach the amplifier 6.

In this situation, the pumping optical energy emitted by the laser unit 19, not being used for the amplification of the signal $\lambda_1$, is not significantly attenuated inside the active core optical fiber 16.

It follows that the microprocessing circuit 29, through the comparison of the signals $V_a$ and $V'_b$ recognizes the existence of an anomalous situation not depending on the amplifier. In this case the microprocessing circuit 29 is programmed to emit a signal $I_{nd}$ directed to the relay 38 which causes the intervention of the generator 37' with the emission of a modulated alarm signal directed to the terminal station 11.

Since the amplifiers down-line of the amplifier 6 act in a similar manner, the location of the position in the line of the optical fiber rupture is promptly found.

From the previously given description and the following considerations it is clear that by means of an optical fiber telecommunication line according to the present invention and the amplifiers according to the invention the objects of the invention are achieved.

The action of associating two laser units with the ends of an active core optical fiber inside the amplifier, a working laser and a reserve laser and the latter operating as a monitoring photodiode, means a reduction in the risks of interruption of operation of the line since, when one of the two lasers is damaged, it can be automatically substituted for the other one avoiding any working interruption in the transmission of signals.

Moreover, the association with the lasers of circuits operating with low frequency modulations that are very reliable and more reliable than the high frequency electronic circuits of the optoelectronic repeaters, permits a continuous control from the terminal stations of the working conditions of all the amplifiers of the line, and in the case described, at stations at the ends of a submarine cable on land.

Moreover the possibility of sending transmission signals and control signals to the various amplifiers from the terminal stations, by superimposing a low frequency modulation upon the high frequency modulation, permits maintaining the line in optimum working conditions without using additional optical fibers in the cables exclusively used for sending these control signals.

Further, the fact that each amplifier according to the invention emits distinct signals, which are received and recognized by the stations 10 and 11 at the ends of the line, permits the determination in the case of damage of the optical fiber of a cable, of the exact location of the damage. This is in addition to monitoring of the operation of the optical fibers present in the various cables and permits, in case of failure, a prompt intervention for carrying out repair.

Although the particular embodiment of a line according to the invention is an optical fiber telecommunication submarine line, the invention is also applicable to lines burried in the earth and to overhead lines.

Although preferred embodiments of the present invention have been described and illustrated, it will be apparent to those skilled in the art that various modifications may be made without departing from the principles of the invention.

We claim:

1. An optical fiber communication line comprising at least first and second optical fiber cables arranged in series end-to-end, an amplifier interposed between and connecting said first and second optical fiber cables, said amplifier comprising an enclosure connected to facing ends of said optical fiber cables, an active core optical fiber length within said enclosure having opposite ends optically connected respectively to an optical fiber of said first cable and to an optical fiber of said second cable, a first pumping optical radiation energy source optically coupled to one end of said active core optical fiber length for supplying pumping optical energy to said one end of said active core optical fiber length, a second pumping optical radiation energy source optically coupled to the other end of said active core fiber length for supplying pumping optical energy to said other end of said active core optical fiber length, processing means coupled to said active core optical fiber length for monitoring variations in the intensity of pumping optical energy within said active core optical fiber portion and transmitting control signals which are a function of the intensity variations of said pumping optical energy, and signal generating and modulating means associated with each pumping optical radiation energy source responsive to said control signals for modulating the pumping optical radiation energy with a signal which is a function of intensity variations of the pumping optical energy.

2. An optical fiber communication line as defined in claim 1, further comprising optical switch means between said first and said second pumping optical radiation energy source responsive to said control signals.

3. An optical fiber communication line as defined in claim 1, further comprising optical coupling means at each end of said active core optical fiber length for optically coupling a respective end of said active core optical fiber length to an optical fiber of an associated optical fiber cable and for optically coupling an associated pumping optical radiation energy source to circuit means including said processing means.

4. An optical fiber communication line as defined in claim 3, wherein said coupling means comprise dichroic couplers.

5. An optical fiber communication line as defined in claim 1, comprising a plurality of optical fiber cables arranged in series and connected in pairs by a plurality of said amplifiers each interposed between and connecting another successive pair of adjacent optical fiber cables.

6. An optical fiber communication line as defined in claim 5, further comprising a plurality of said signal generating and modulating means each associated with another one of said amplifiers for modulating each pumping optical radiation energy source at a different identifiable low frequency.

7. An optical fiber communication line as defined in claim 1, further comprising transmitting and receiving stations at the ends of the optical fiber communication line for receiving and transmitting optical radiation for the transmission of signals.

8. An optical fiber communication line as defined in claim 1 further comprising switching means connected to said first optical radiation energy source and to said second optical radiation energy source and responsive to a signal received from said first optical fiber cable for alternately energizing said first optical radiation energy source and said second optical radiation energy source.

9. An optical fiber communciation line as defined in claim 8 wherein the first one of said optical fiber cables is connected to a source of optical signals and is connected at one end of said active core optical fiber length so that all the energy of said optical signals is supplied to said one end of said active core optical fiber.

10. An amplifier for an optical fiber communication line having first and second optical fiber cables arranged in series, the amplifier comprising an enclosure connectable to facing ends of the optical fiber cables, an active core optical fiber length within said enclosure having ends optically connectable to an optical fiber of the first cable and to an optical fiber of the second cable, a first pumping optical radiation energy source optically coupled to one end of said active core optical fiber length for supplying pumping optical energy to said one end of said active core optical fiber length, a second pumping optical radiation source optically coupled to the other end of said active core fiber length for supplying pumping optical energy to said other end of said active core optical fiber length, processing means coupled to said active core optical fiber length for monitoring variations in the intensity of pumping optical energy within said active core optical fiber length and transmitting control signals which are a function of the intensity variations of said pumping energy, and signal generating and modulating means associated with each pumping optical radiation energy source responsive to said control signals for modulating the pumping optical energy with a signal which is a function of intensity variations of the pumping optical energy.

11. An amplifier for an optical fiber communication line as defined in claim 10, further comprising optical switch means between said first and said second pumping optical radiation energy source responsive to said control signals.

12. An amplifier for an optical fiber communication line as defined in claim 10, further comprising optical coupling means at each end of said active core optical fiber length for optically coupling a respective end of said active core optical fiber length to an optical fiber of an associated optical fiber cable and for optically coupling an associated pumping optical radiation energy source to circuit means including said processing means.

13. An amplifier for an optical fiber communication line as defined in claim 12, wherein said coupling means comprise dichroic couplers.

* * * * *